(12) United States Patent
Lee (10) Patent No.: US 6,571,264 B1
(45) Date of Patent: May 27, 2003

(54) FLOATING-POINT ARITHMETIC DEVICE (75) Inventor: Dong Sun Lee, Kyonggi-do (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/541,679

(22) Filed: Mar. 31, 2000

(30) Foreign Application Priority Data

Apr. 2, 1999 (KR) .............................. 99-11618

(51) Int. Cl.⁷ ................................................ G06F 7/38
(52) U.S. Cl. ........................ 708/495; 708/205; 708/497
(58) Field of Search ................................ 708/205, 501, 708/505, 495, 498, 552, 211, 499, 496

(56) References Cited

U.S. PATENT DOCUMENTS

| 4,926,369 | A | | 5/1990 | Hokenek et al. | ............ | 364/748 |
| 4,994,996 | A | * | 2/1991 | Fossum et al. | ............. | 708/505 |
| 5,027,308 | A | * | 6/1991 | Sit et al. | ..................... | 708/505 |
| 5,136,536 | A | * | 8/1992 | Ng | ............................. | 708/505 |
| 5,197,023 | A | * | 3/1993 | Nakayama | .................. | 708/505 |
| 5,373,461 | A | * | 12/1994 | Bearden et al. | ............. | 708/505 |
| 5,684,729 | A | * | 11/1997 | Yamada et al. | ............. | 708/505 |
| 5,751,621 | A | * | 5/1998 | Arakawa | .................... | 708/501 |
| 5,757,682 | A | * | 5/1998 | Schwarz et al. | ........... | 708/205 |
| 5,928,316 | A | * | 7/1999 | Wong et al. | ................ | 708/501 |
| 6,405,232 | B1 | * | 6/2002 | Green et al. | ................ | 708/505 |

OTHER PUBLICATIONS

Hirroaki Suzuki et al., "Leading–Zero Anticipatory Logic for High Speed Floating Point Addition," Journal of Solid–State Circuits, vol. 31, No. 8, Aug. 1996, pp. 1157–1164.

* cited by examiner

Primary Examiner—Chuong Dinh Ngo
Assistant Examiner—Chat C. Do
(74) Attorney, Agent, or Firm—Fleshner & Kim, LLP (57) ABSTRACT A floating-point arithmetic device, including a significand output circuit for calculating a difference between exponents, outputting a first significand with a larger exponent, and shifting the remaining significand by the calculated exponent difference, a first bit inverter, an adder, a leading-zero anticipation circuit for anticipating the consecutiveness of leading zeros from the significands, a leading-zero counter for counting the anticipated number of leading zeros, a left shifter for shifting an output value from the adder, a second bit inverter for taking two's complement of an output value from the left shifter, an incrementer for incrementing an output value from the second bit inverter by one, a compensation shifter for shifting an output value from the incrementer, an exponent subtracter for subtracting the number counted by the leading-zero counter from the larger exponent, and a decrementer for decrementing an output exponent from the exponent subtracter by one.

9 Claims, 5 Drawing Sheets

FLOATING-POINT ARITHMETIC DEVICE

BACKGROUND OF THE INVENTION

1. Field of the Invention

The present invention relates in general to floating-point arithmetic devices, and more particularly to a floating-point arithmetic device using a leading-zero anticipation circuit to increase an operation speed.

2. Description of the Prior Art

In a floating-point arithmetic device, generally, an input operand for calculation is composed of a sign block representing addition ("+") or subtraction ("−"), an exponent block representing a magnitude of the operand and a significand block representing significant digits. For example, if the input operand is $0.11 \times 2^8$, the exponent is "8" and the significand is "11".

In floating-point addition, exponents of two significands are compared with each other and one of the significands wish the smaller exponent is shifted to the right. Then, the two significands are summed and the number of consecutive leading zeros is calculated from the summed result. This procedure is performed on the assumption that a most significant bit of the significand is always 1 for the effective use of hardware in the expression of a real number, which is called normalization.

The significand after this procedure of normalization is expressed in a range between 0.5 and 1.0.

Such a conventional floating-point arithmetic device will hereinafter be mentioned with reference to the accompanying drawings.

Figure 1:
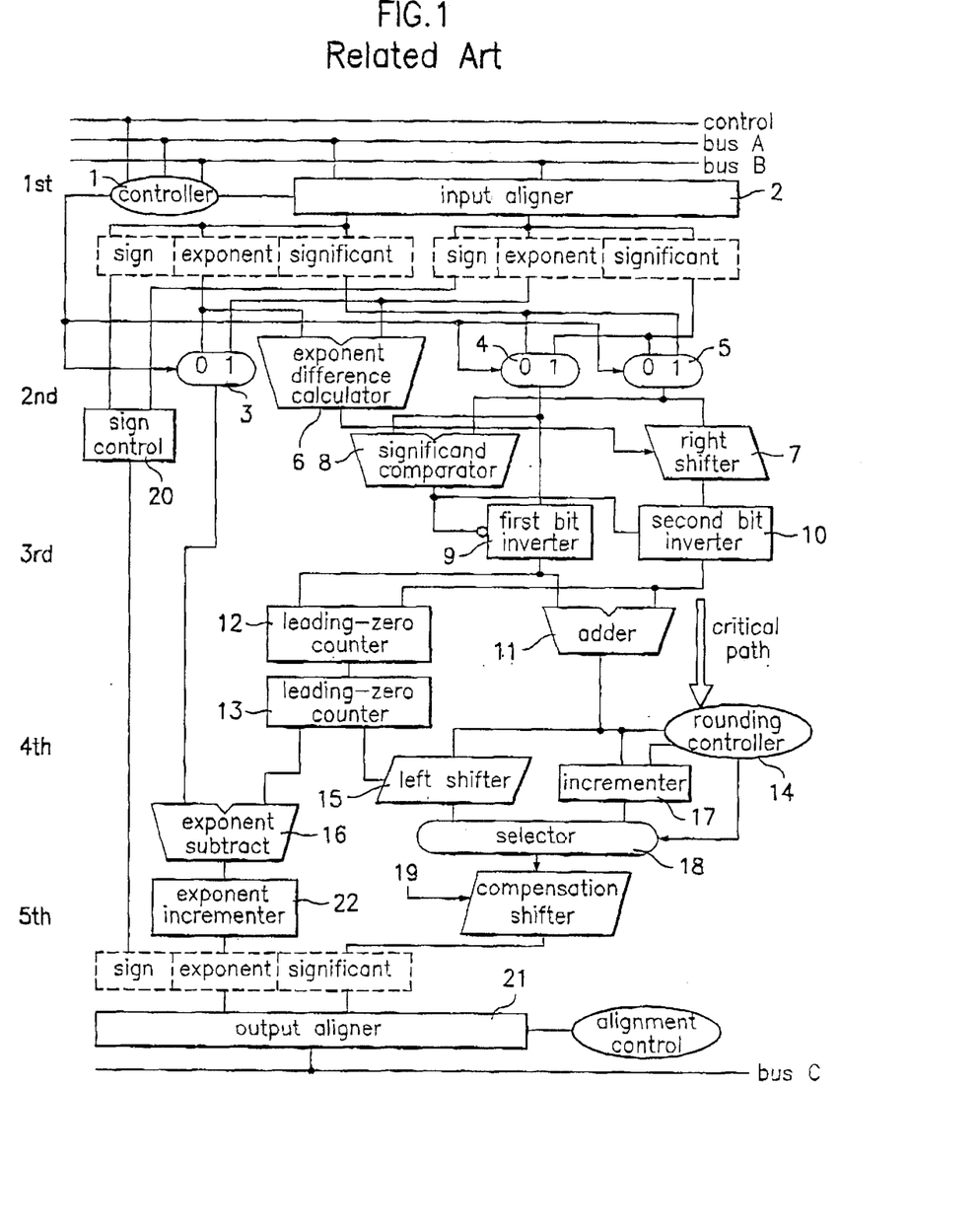
FIG. 1 is a block diagram showing the construction of a conventional floating-point arithmetic device.
Figure 2:
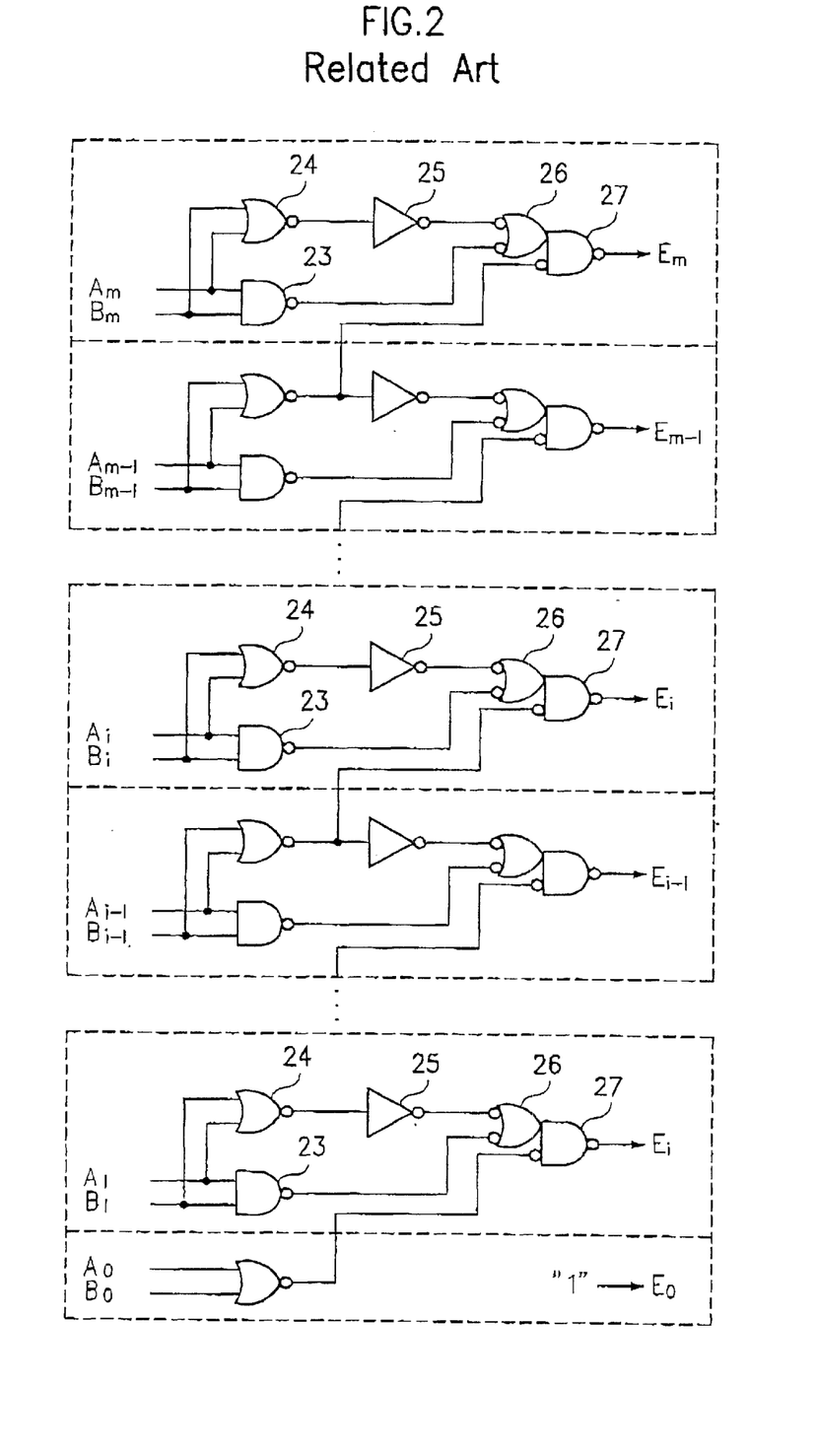
FIG. 2 is a detailed circuit diagram of a leading-zero anticipation circuit in FIG. 1.

FIG. 1 is a block diagram showing the construction of a conventional TFT-LCD floating-point arithmetic device and FIG. 2 is a detailed circuit diagram of a leading-zero anticipation circuit in FIG. 1.

With reference to FIG. 1, the floating-point arithmetic device comprises an input aligner 2 for suitably aligning two input operands, a controller 1 for comparing exponents of the input operands aligned by the input aligner 2 with each other and generating a control signal in accordance with the compared result, and a first multiplexer 3 for selecting a larger one of the exponents of the input operands in response to the control signal from the controller 1. A second multiplexer 4 selects a significand of one of the input operands with the larger exponent in response to the control signal from the controller 1 and a third multiplexer 5 selects a significand of the other input operand with a smaller one of the exponents in response to the control signal from the controller 1. An exponent difference calculator 6 is adapted to calculate a difference between the exponents of the input operands. A right shifter 7 shifts the significand selected by the third multiplexer 5 to the right by the exponent difference calculated by the exponent difference calculator 6 to establish digit matching. A significand comparator 8 acts to compare the significands selected by the second and third multiplexers 4 and 5 with each other. First and second bit inverters 9 and 10 invert the significand selected by the second multiplexer 4 and the significand shifted by the right shifter 7 in response to an output signal from the significand comparator 8, respectively, to take two's complements thereof for subtraction by an adder 11 which will hereinafter be mentioned. The adder 11 is adapted to add output values from the first and second bit inverters 9 and 10. A leading-zero anticipation circuit 12 functions to anticipate the consecutiveness of leading zeros from the output values from the first and second bit inverters 9 and 10. A leading-zero counter 13 counts the number of the leading zeros anticipated by the leading-zero anticipation circuit 12. A rounding controller 14 is adapted to estimate a rounding condition to store an output value from the adder 11 in a specific bits number. As incrementer 17 adds "1" to a least significant bit of the stored value under the control of the rounding controller 14. A left shifter 15 acts to shift the output value from the adder 11 to the left by the number counted by the leading-zero counter 13. A selector 18 functions to select one of an output value from the left shifter 15 and an output value from the incrementer 17 under the control of the rounding controller 14 according to whether the right shifter 7 and second bit inverter 10 are in operation. A compensation shifter 19 shifts an output significand from the selector 18 to perform digit compensation when it is the maximum. An exponent subtracter 16 is adapted to subtract the number counted by the leading-zero counter 13 from the larger exponent selected by the first multiplexer 3. A sign controller 20 determines a sign of the final output value according to signs of the input operands. An exponent incrementer 22 acts to increment an output exponent from the exponent subtracter 16 to compensate for the leading-bit position. An output aligner 21 is adapted to align an output sign from the sign controller 20, an output exponent from the exponent incrementer 22 and an output significand from the compensation shifter 19 to provide the final output value.

The leading-zero anticipation circuit 12 has a construction as shown in FIG. 2.

In FIG. 2, the leading-zero anticipation circuit 12 is shown to calculate bit values at respective digits of the significands of the two input operands, on the assumption that the significands are each composed of m bits $A_m$, $A_{m-1}$, ..., $A_i$, $A_{i-1}$, ..., $A_1$, $A_0$ and $B_m$, $B_{m-1}$, ..., $B_i$, $B_{i-1}$, ..., $B_1$, $B_0$. Namely, the leading-zero anticipation circuit 12 includes a NAND gate 23 for NANDing values of two input bits $A_i$ and $B_i$ of the same digit, a NOR gate 24 for NORing the values of the two input bits $A_i$ and $B_i$ of the same digit, an inverter 25 for inverting an output value from the NOR gate 24, an OR gate 26 for ORing the inverted ones of output values from the inverter 25 and NAND gate 23, and a NAND gate 27 for NANDing the inverted one of the NORed result of values of two input bits $A_{i-1}$ and $B_{i-1}$ of the next digit and an output value from the OR gate 26.

Now, the operation of the conventional floating-point arithmetic device with the above-mentioned construction will be described.

First inputted over respective external data buses are two operands, each of which is composed of a sign block representing addition ("+") or subtraction ("−"), an exponent block representing a magnitude of the operand and a significand block representing significant digits.

The input aligner 2 suitably aligns the two input operands and the controller 1 compares exponents of the input operands aligned by the input aligner 2 with each other and generates a control signal in accordance with the compared result so that a significand of one of the input operands with the smaller exponent can be outputted through the third multiplexer 5 and the larger exponent can be outputted through the first multiplexer 3.

As a result, in response to the control signal from the controller 1, the first multiplexer 3 selects the larger exponent, the third multiplexer 5 selects the significand of the input operand with the smaller exponent and the second multiplexer 4 selects a significand of the other input operand with the larger exponent.

The exponent difference calculator 6 calculates a difference between the exponents of the input operands and the right shifter 7 shifts the significand selected by the third multiplexer 5 to the right by the exponent difference calculated by the exponent difference calculator 6 to establish digit matching.

The significand comparator 8 compares the significands selected by the second and third multiplexers 4 and 5 with each other.

In order to provide two's complements to input terminals of the adder 11 for subtraction, the first bit inverter 9 inverts the significand selected by the second multiplexer 4 in response to an output signal from the significand comparator 8 and the second bit inverter 10 inverts the significand shifted by the right shifter 7 in response to the output signal from the significand comparator 8. In the case of non-subtraction, the first and second bit inverters 9 and 10 pass their input values directly without inverting them.

The adder 11 adds output values from the first and second bit inverters 9 and 10. In the case of addition, the adder 11 performs the addition regardless of the magnitudes of two input values. But, in the case of subtraction, the adder 11 always subtracts the smaller value from the larger value, Accordingly, the added or subtracted result of the adder 11 is always positive.

The significand comparator 8 performs the comparison operation as follows:

$$\text{if } A \geq B, \text{ then } A' = A, B' = /B$$
$$\text{if } A < B, \text{ then } A' = /A, B' = B \qquad \text{[equation 1]}$$

The adder 11 executes the calculation of "A−B" as the operation of "A+/B+1" and the calculation of "B−A" as the operation of "B+/A+1".

The leading-zero anticipation circuit 12 anticipates the consecutiveness of leading zeros from the output values from the first and second bit inverters 9 and 10 and the leading-zero counter 13 counts the number of the leading zeros anticipated by the leading-zero anticipation circuit 12.

That is, the leading-zero anticipation circuit 12 performs the following arithmetic operation for respective digits:

$$E_i = /(A_i' \oplus B_i') \cdot (A_{i-1}' + B_{i-1}') = (A_i' \cdot B_i' + /(A_i' + B_i')) \cdot (A_{i-1}' + B_{i-1}') \quad \text{[equation 2]}$$

The leading-zero counter 13 counts the output $E_m$, $E_{m-1}$, ..., $E_i$, $E_{i-1}$, ..., $E_1$, $E_0$ of the leading-zero anticipation circuit 12 so as to count the number of consecutive leading zeros. Namely, in the case where the output of the leading-zero anticipation circuit 12 is 000001011, the leading-zero counter 13 counts "5".

On the other hand, a most significant bit of the output value from the adder 11 may be "0". In order to make the most significant bit "1", the left shifter 15 shifts the output value from the adder 11 to the left by the number counted by the leading-zero counter 13.

In order to store the output value from the adder 11 in a specific bits number, the rounding controller 14 estimates a rounding condition to output a round-up or down signal. The incrementer 17 adds "1" to a least significant bit of the stored value under the control of the rounding controller 14. The selector 18 selects one of an output value from the left shifter 15 and an output value from the incrementer 17 under the control of the rounding controller 14, resulting in the significand calculation being completed.

The exponent subtracter 16 subtracts the number counted by the leading-zero counter 13 from the larger exponent selected by the first multiplexer 3, resulting in the exponent calculation being completed.

However, in the above-mentioned conventional floating-point arithmetic device, the smaller significand is always subtracted from the larger significand, thereby causing the significand comparator and two bit inverters to be required. This requirement makes the circuit construction complicated and decreases the operation speed.

SUMMARY OF THE INVENTION

Therefore, the present invention has been made in view of the above problem, and it is an object of the present invention to provide a floating-point arithmetic device in which a leading-zero anticipation circuit is implemented to calculate input operands regardless of their magnitudes, so as to increase an operation speed.

In accordance with the present invention, the above and other objects can be accomplished by a provision of a floating-point arithmetic device comprising first control means for comparing signs of two input operands with each other and generating a control signal in accordance with the compared result; significand output means for calculating a difference between exponents of said input operands, outputting a significand of one of said input operands with a larger one of said exponents as it is, shifting a significand of the other input operand with a smaller one of said exponents by the calculated exponent difference and outputting the shifted significand; a multiplexer for selecting said larger exponent in response to said control signal from said first control means; a first bit inverter for inverting said significand with said larger exponent from said significand output means for subtraction in response to said control signal from said first control means; an adder for adding said shifted significand with said smaller exponent from said significand output means and an output value from said first bit inverter; leading-zero anticipation means for anticipating the consecutiveness of leading zeros from said significand with said larger exponent and said shifted significand with said smaller exponent from said significand output means; leading-zero counting means for counting the number of said leading zeros anticipated by said leading-zero anticipation means; second control means for estimating a rounding condition to store an output value from said adder in a specific bits number; a left shifter for shifting the output value from said adder to the left by said number counted by said leading-zero courting means; a second bit inverter for taking two's complement of an output value from said left shifter if the output value from said adder is negative; an incrementer for incrementing an output value from said second bit inverter by one under the control of said second control means to provide a final significand; a compensation shifter for shifting the final significand from said incrementer to perform digit compensation when it is the maximum; an exponent subtracter for subtracting said number counted by said leading-zero counting means from said larger exponent selected by said multiplexer; and a decrementer for decrementing an output exponent from said exponent subtracter by one to provide a final exponent.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 3:
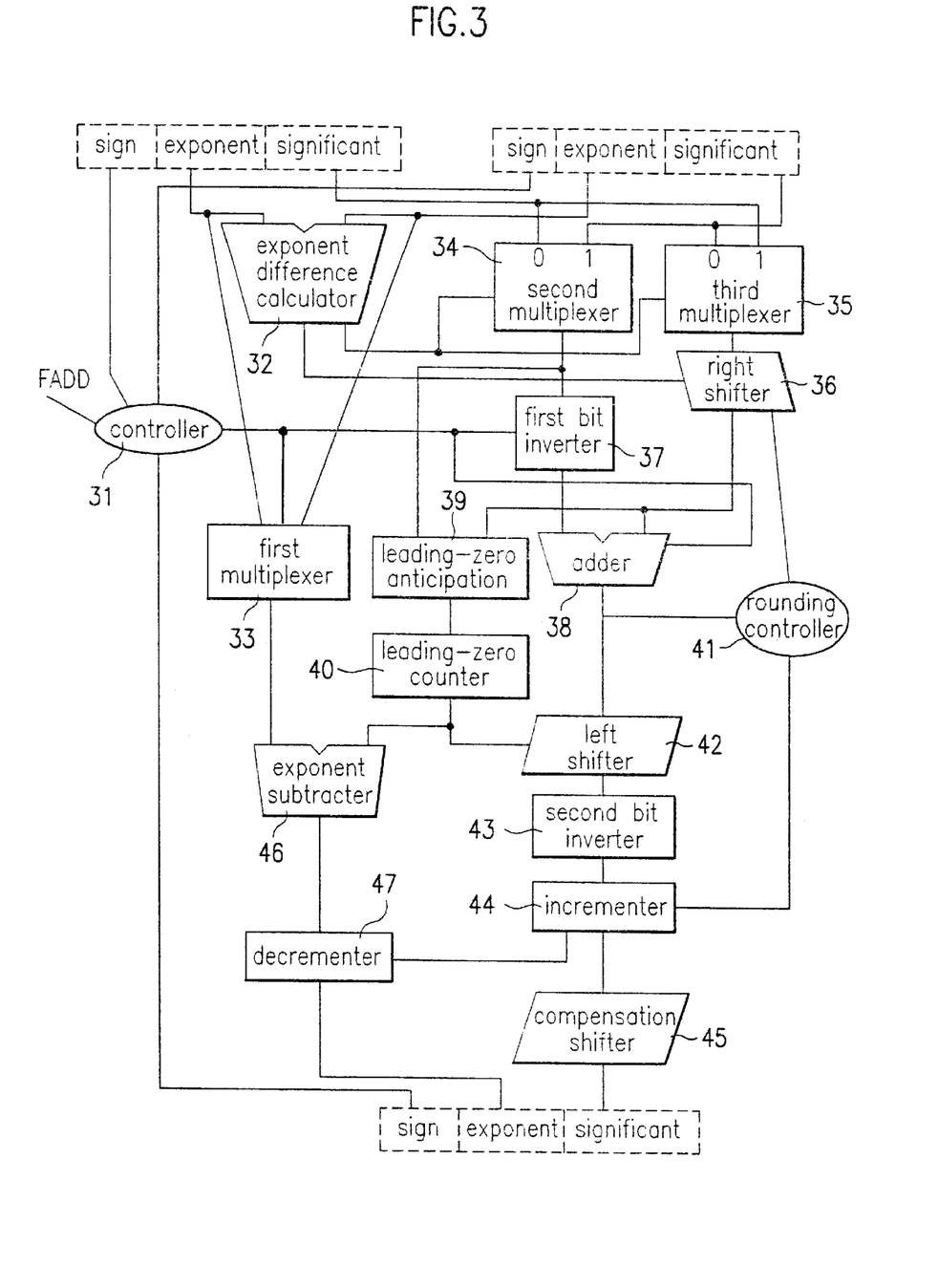
FIG. 3 is a block diagram showing the construction of a floating-point arithmetic device in accordance with the present invention.
Figure 4:
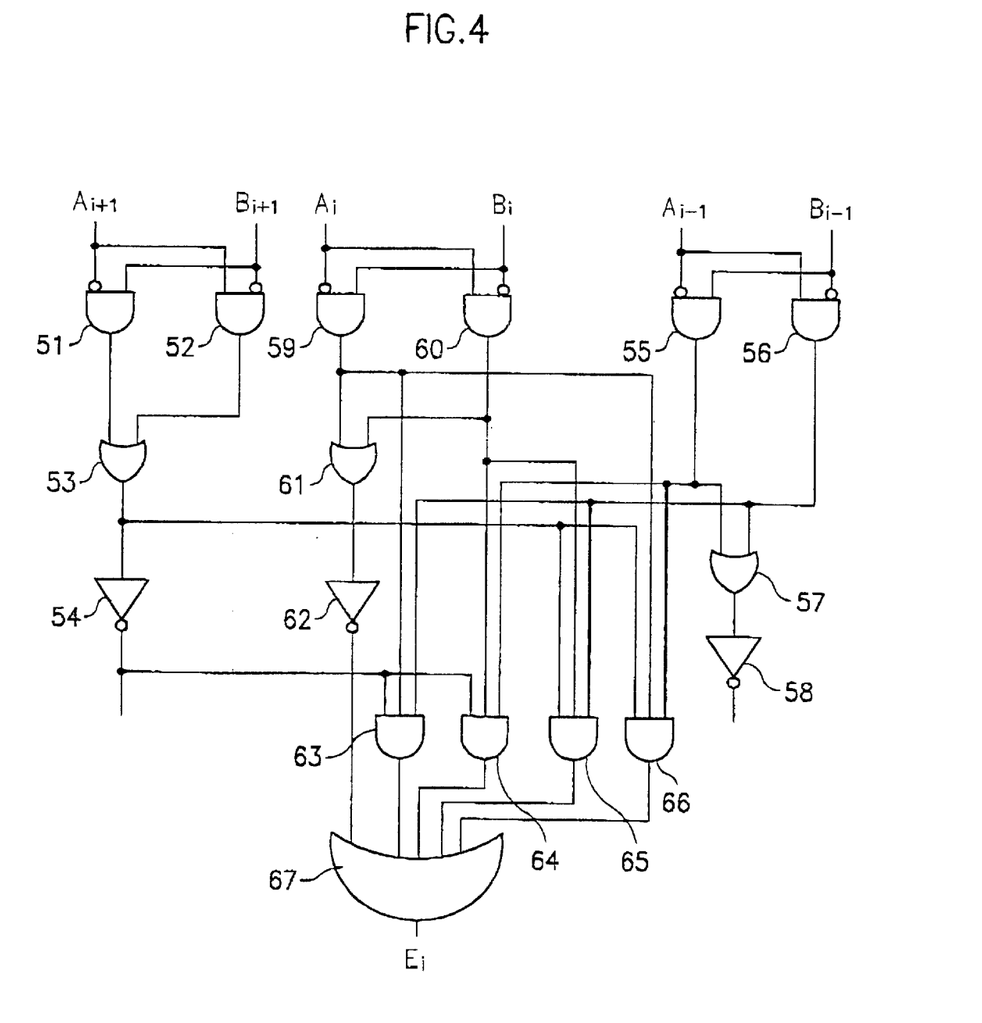
FIG. 4 is a detailed circuit diagram of a leading-zero anticipation circuit in FIG. 3.
Figure 5:
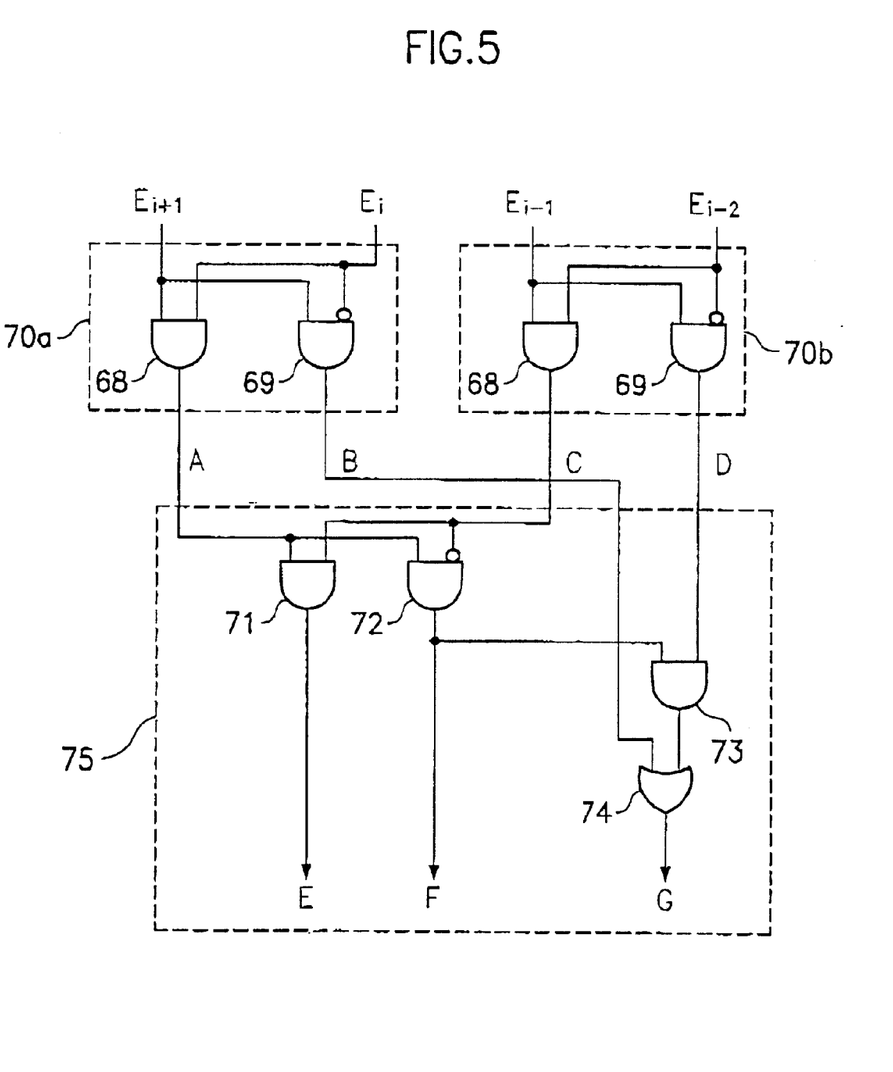
FIG. 5 is a detailed circuit diagram of a leading-zero counter in FIG. 3.

FIG. 3 is a block diagram showing the construction of a floating-point arithmetic device in accordance with the present invention, FIG. 4 is a detailed circuit diagram of a leading-zero anticipation circuit in FIG. 3 and FIG. 5 is a detailed circuit diagram of a leading-zero counter in FIG. 3.

With reference to FIG. 3, the floating-point arithmetic device comprises a controller 31 for comparing signs of two input operands with each other and generating a control signal in accordance with the compared result, and an exponent difference calculator 32 for calculating a difference between exponents of the input operands and generating a control signal indicative of which one of the exponents is larger. A first multiplexer 33 is adapted to select a larger one of the exponents of the input operands. A second multiplexer 34 selects a significand of one of the input operands with the larger exponent in response to the control signal from the exponent difference calculator 32 and a third multiplexer 35 selects a significand of the other input operand with a smaller one of the exponents in response to the control signal from the exponent difference calculator 32. A tight shifter 36 acts to shift the significand selected by the third multiplexer 35 to the right by the exponent difference calculated by the exponent difference calculator 32. A first bit inverter 37 inverts the significand selected by the second multiplexer 34 in response to the control signal from the controller 31 to take two's complement thereof for subtraction by an adder 38 which will hereinafter be mentioned. The adder 38 is adapted to add the significand selected by the second multiplexer 34 or an output value from the first bit inverter 37 and an output value from the right shifter 36. A leading-zero anticipation circuit 39 functions to anticipate the consecutiveness of leading zeros from the significand selected by the second multiplexer 34 and the output value from the right shifter 36, A leading-zero counter 40 counts the number of the leading zeros anticipated by the leading-zero anticipation circuit 39 in response to the control signal from the controller 31. A rounding controller 41 is adapted to estimate a rounding condition to store an output value from the adder 38 in a specific bits number. A left shifter 42 shifts the output value from the adder 38 to the left by the number counted by the leading-zero counter 40. A second bit inverter 43 is adapted to take two's complement of an output value from the left shifter 42 if the output value from the adder 38 is negative. An incrementer 44 increments an output value from the second bit inverter 43 by one under the control of the rounding controller 41 to provide the final significand. A compensation shifter 45 shifts the final significand from the incrementer 44 to perform digit compensation when it is the maximum. An exponent subtracter 46 is adapted to subtract the number counted by the leading-zero counter 40 from the larger exponent selected by the first multiplexer 33. A decrementer 47 acts to decrement an output exponent from the exponent subtracter 46 by one to provide the final exponent.

The leading-zero anticipation circuit 39 has a construction as shown in FIG. 4.

In FIG. 4, the leading-zero anticipation circuit 39 is shown to anticipate a leading zero of one specific digit, on the assumption that the significands of the two input operands are each composed of a plurality of bits . . . , $A_{i+1}$, $A_i$, $A_{i-1}$, . . . and . . . , $B_{i+1}$, $B_i$, $B_{i-1}$, . . . , where $A_{i+1}$ is the upper bit of $A_i$, $A_{i-1}$ is the lower bit of $A_i$, $B_{i+1}$ is the upper bit of $B_i$ and $B_{i-1}$ is the lower bit of $B_i$.

As shown in FIG. 4, the leading-zero anticipation circuit 39 includes a first AND gate 51 for ANDing the inverted one of a value of an input bit $A_{i+1}$ and a value of an input bit $B_{i+1}$, a second AND gate 52 for ANDing the inverted one of the value of the input bit $B_{i+1}$ and the value of the input bit $A_{i+1}$, a first OR gate 53 for ORing output values from the first and second AND gates 51 and 52, and a first inverter 54 for inverting an output value from the first OR gate 53. The leading-zero anticipation circuit 39 further includes a third AND gate 55 for ANDing the inverted one of a value or an input bit $A_{i-1}$ and a value of an input bit $B_{i-1}$, a fourth AND gate 56 for ANDing the inverted one of the value of the input bit $B_{i-1}$ and the value of the input bit $A_{i-1}$, a second OR gate 57 for ORing output values from the third and fourth AND gates 55 and 56, and a second inverter 58 for inverting an output value from the second OR gate 57. The leading-zero anticipation circuit 39 further includes a fifth AND gate 59 for ANDing the inverted one of a value of an input bit $A_i$ and a value of an input bit $B_i$, a sixth AND gate 60 for ANDing the inverted one of the value of the input bit $B_i$ and the value of the input bit $A_i$, a third OR gate 61 for ORing output values from the fifth and sixth AND gates 59 and 60, and a third inverter 62 for inverting an output value from the third OR gate 61. The leading-zero anticipation circuit 39 further includes a seventh AND gate 63 for ANDing an output value from the first inverter 54, the output value from the fifth AND gate 59 and the output value from the fourth AND gate 56, an eighth AND gate 64 for ANDing the output value from the first inverter 54, the output value from the sixth AND gate 60 and the output value from the third AND gate 55, a ninth AND gate 65 for ANDing the output value from the first OR gate 53, the output value from the sixth AND gate 60 and the output value from the fourth AND gate 56, a tenth AND gate 66 for ANDing the output value from the first OR gate 53, the output value from the fifth AND gate 59 and the output value from the third AND gate 55, and a fourth OR gate 67 for ORing an output value from the third inverter 62 and output values from the seventh to tenth AND gates 63–66 and outputting the ORed result as a leading-zero anticipation signal $E_i$ of the specific digit.

In the case where the input bits $A_i$ and $B_i$ are most significant bits (MSBs), the values of the upper bits $A_{MSB+1}$ and $B_{MSB+1}$ are regarded as "0". If the input bits $A_i$ and $B_i$ are least significant bits (LSBs), namely, $A_0$ and $B_0$, the values of the lower bits $A_{-1}$ and $B_{-1}$ are regarded as "0".

On the other hand, the leading-zero counter 40 is adapted to count the number of consecutive upper "1" bits from the output of the leading-zero anticipation circuit 39 and has a construction as shown in FIG. 5.

The construction of the leading-zero counter 40 will hereinafter be mentioned on the assumption that the output of the leading-zero anticipation circuit 39 is . . . , $E_{i+1}$, $E_i$, $E_{i-1}$, $E_{i-2}$, . . .

As shown in FIG. 5, the leading-zero counter 40 includes a plurality of first counters 70a, 70b, . . . , each of which outputs 2-bit data in response to values of two consecutive bits of the leading-zero anticipation signal from the leading-zero anticipation circuit 39. To this end, each of the first counters includes an eleventh AND gate 68 for ANDing the two bit values from the leading-zero anticipation circuit 39 to determine whether they are "11", and a twelfth AND gate 69 for ANDing the inverted one of the value of a lower one of the two bits and the value of an upper one of the two bits to determine whether the two bit values are "10". The leading-zero counter 40 further includes a plurality of second counters 75, each of which outputs 3-bit data in response to the 2-bit data from two adjacent ones of the first counters 70a, 70b, . . . ,. To this end, each of the second counters 75 includes thirteenth to fifteenth AND gates 71–73 and a fifth OR gate 74.

The thirteenth AND gate 71 ANDs values of upper bits A and C of the 2-bit data from the two adjacent first counters 70a and 70b to output 1-bit data E. The fourteenth AND gate 72 ANDs the value of the upper bit A from the upper first counter 70a and the inverted one of the value of the upper bit C from the lower first counter 70b to output 1-bit data F. The fifteenth AND gate 73 ANDs a value of a lower bit D of the 2-bit dala from the lower first counter 70b and an output value from the fourteenth AND gate 72. The fifth OR gate 74 is adapted to OR a value of a lower bit B of the 2-bit data from the upper first counter 70a and an output value from the fifteenth AND gate 73 to output the remaining 1-bit data G.

Noticeably, each of the first counters 70a, 70b, . . . outputs "10" if the two consecutive bits $E_{i+1}$ and $E_i$ or $E_{i-1}$ and $E_{i-2}$ from the leading-zero anticipation circuit 39 are "11". Also, each of the first counters 70a, 70b, . . . outputs "01" if only the upper one of the two consecutive bits from the leading-zero anticipation circuit 39 is "1", and "00" regardless of the value of the lower bit if the upper bit is "0".

Each of the second counters 75 makes the most significant bit E "1" if the upper bits A and C of the 2-bit data from the two adjacent first counters 70a and 70b are both "1". Also, each of the second counters 75 makes the middle bit F "1" if the upper bit A from the upper first counter 70a is "1" and the upper bit C from the lower first counter 70b is "0", and the least significant bit G "1" if the middle bit F and the lower bit D from the lower first counter 70b are both "1" or if the lower bit B from the upper first counter 70a is "1". This procedure is continuously performed in a binary tree manner to obtain the final result.

Now, a detailed description will be given of the operation of the floating-point arithmetic device with the above-mentioned construction in accordance with the present invention.

First, upon receiving exponents of two input operands, the exponent difference calculator 32 calculates a difference between the received exponents and generates a control signal indicative of which one of the exponents is larger.

In response to the control signal from the exponent difference calculator 32, the second multiplexer 34 selects a significand of one of the input operands with the larger exponent and the third multiplexer 35 selects a significand of the other input operand with the smaller exponent.

The right shifter 36 shifts the significand selected by the third multiplexer 35 to the right by the exponent difference calculated by the exponent difference calculator 32.

The leading-zero anticipation circuit 39 anticipates the consecutiveness of leading zeros from the significand selected by the second multiplexer 34 and an output value from the right shifter 36.

Namely, the leading-zero anticipation circuit 39 performs the following arithmetic operation:

$$Ei=(A_i==B_i) \text{ or}$$

$$((A_{i+1}==B_{i+1}) \text{ and } (/A_iB_iA_{i-1}/B_{i-1}) \text{ or}$$

$$((A_{i+1}==B_{i+1}) \text{ and } (A_i/B_i/A_{i-1}B_{i-1}) \text{ or}$$

$$((A_{i+1}\neq B_{i+1}) \text{ and } (A_i/B_iA_{i-1}/B_{i-1})) \text{ or}$$

$$((A_{i+1}\neq B_{i+1}) \text{ and } (/A_iB_i/A_{i-1}B_{i-1})) \qquad \text{[equation 3]}$$

The above arithmetic operation of the leading-zero anticipation circuit 39 will hereinafter be described in more detail with reference to several examples.

FIRST EXAMPLE

Assuming that the calculation condition of two significands is 101011100–10110001, the output data from the leading-zero anticipation circuit 39 is 11111100. Here, the leading-zero anticipation circuit 39 is designed in such a manner that its output data value of "1" represents an anticipated value of "0" and its output data value of "0" represents an anticipated value of "1". Calculating the above calculation condition in practice, the result is 00000011.

SECOND EXAMPLE

Assuming that the calculation condition of two significands is 10110000–10101110, the output data from the leading-zero anticipation circuit 39 is 11111101. Calculating the above calculation condition in practice, the result is 00000010.

As seen from the first and second examples, there is a coincidence between the actually calculated value and the anticipated value from the leading-zero anticipation circuit 39.

However, in some cases, there may be no coincidence between the actually calculated value and the anticipated value from the leading-zero anticipation circuit 39.

THIRD EXAMPLE

Assume that the calculation condition of two significands A and B is A–B, where A is 10100001 and B=10001001.

The significand B is inverted into 01110110 by the first bit inverter 37. Because the two significands A and B have the same exponent, the right shifter 36 outputs the significand B, 10001001, as it is.

Hence, the leading-zero anticipation circuit 39 outputs 11010111, which is transferred to the leading-zero counter 40. As a result, the leading-zero counter 40 counts "2".

The adder 38 adds the output value from the first bit inverter 37 and the output value from the right shifter 36 while receiving "1" from the controller 31 as a carry-in signal. Consequently, the adder 38 outputs data of 00011000, which is transferred to the left shifter 42. Because the count of the leading-zero counter 40 is "2", the left shifter 42 shifts the output value from the adder 38 to the left by 2 and thus provides its output of 01100000.

Since the output of the left shifter 42 is not negative, it is directly passed by the second bit inverter 43. Also, the rounding controller 41 outputs a value of "0". As a result, the incrementer 44 outputs 01100000.

Then, the compensation shifter 45 shifts the output value from the incrementer 44 to the left by one bit because a most significant bit thereof is "0".

As apparent from the above description, according to the present invention, the floating-point arithmetic device has the following advantages.

Firstly, the input operands can be calculated regardless of their magnitudes, thereby increasing the operation speed as compared with the conventional device where the smaller operand is always subtracted from the larger operand.

Secondly, only one bit inverter is used for the calculation of the two input operands, resulting in a reduction in cost as compared with the conventional device where two bit inverters are used for such calculation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A floating-point arithmetic device comprising:

first control means for comparing signs of two input operands with each other and generating a control signal in accordance with the compared result;

significand output means for calculating a difference between exponents of said input operands, outputting a significand of one of said input operands with a larger one of said exponents as it is, shifting a significand of the other input operand with a smaller one of said exponents by the calculated exponent difference and outputting the shifted significand;

a multiplexer for selecting said larger exponent in response to said control signal from said first control means;

a first bit inverter for inverting said significand with said larger exponent from said significand output means for subtraction in response to said control signal from said first control means;

an adder for adding said shifted significand with said smaller exponent from said significand output means and an output value from said first bit inverter;

leading-zero anticipation means for anticipating the consecutiveness of leading zeros from said significand with said larger exponent and said shifted significand with said smaller exponent from said significand output means;

leading-zero counting means for counting the number of said leading zeros anticipated by said leading-zero anticipation means;

second control means for estimating a rounding condition to store an output value from said adder in a specific bits number;

a left shifter for shifting the output value from said adder to the left by said number counted by said leading-zero counting means;

a second bit inverter for taking two's complement of an output value from said left shifter if the output value from said adder is negative;

an incrementer for incrementing an output value from said second bit inverter by one under the control of said second control means to provide a final significand;

a compensation shifter for shifting the final significand from said incrementer to perform digit compensation when it is in the maximum;

an exponent subtracter for subtracting said number counted by said leading-zero counting means from said larger exponent selected by said multiplexer; and a decrementer for decrementing an output exponent from said exponent subtracter by one to provide a final exponent.

2. A floating-point arithmetic device comprising:

first control means for comparing signs of two input operands with each other and generating a control signal in accordance with the compared result;

an exponent difference calculator for calculating a difference between exponents of said input operands and generating a control signal indicative of which one of said exponents is larger;

a first multiplexer for selecting a larger one of said exponents of said input operands;

a second multiplexer for selecting a significand of one of said input operands with said larger exponent in response to said control signal from said exponent difference calculator;

a third multiplexer for selecting a significand of the other input operand with a smaller one of said exponents in response to said control signal from said exponent difference calculator;

a right shifter for shifting said significand selected by said third multiplexer to the right by the exponent difference calculated by said exponent difference calculator;

a first bit inverter for inverting said significand selected by said second multiplexer in response to said control signal from said first control means to take two's complement thereof for subtraction;

an adder for adding said significand selected by said second multiplexer or an output value from said first bit inverter and an output value from said right shifter;

leading-zero anticipation means for anticipating the consecutiveness of leading zeros from said significand selected by said second multiplexer and the output value from said right shifter;

leading-zero counting means for counting the number of said leading zeros anticipated by said leading-zero anticipation means in response to said control signal from said first control means;

second control means for estimating a rounding condition to store an output value from said adder in a specific bits number;

a left shifter for shifting the output value from said adder to the left by the number counted by said leading-zero counting means;

a second bit inverter for taking two's complement of an output value from said left shifter if the output value from said adder is negative;

an incrementer for incrementing an output value from said second bit inverter by one under the control of said second control means to provide a final significand;

compensation shifter for shifting the final significand from said incrementer to perform digit compensation when it is the maximum;

an exponent subtracter for subtracting said number counted by said leading-zero counting means from said larger exponent selected by said first multiplexer; and a decrementer for decrementing an output exponent from said exponent subtracter by one to provide a final exponent.

3. A floating-point arithmetic device as set forth in claim 1, wherein said leading-zero anticipation means includes:

a first AND gate for ANDing the inverted one of a value of an upper bit of a first specific bit of said significand with said larger exponent and a value of an upper bit of a second specific bit of said shifted significand with said smaller exponent, said first and second specific bits belonging to the same specific digit;

a second AND gate for ANDing the inverted one of the value of said upper bit of said second specific bit and the value of said upper bit of said first specific bit;

a first OR gate for ORing output values from said first and second AND gates;

a first inverter for inverting an output value from said first OR gate;

a third AND gate for ANDing the inverted one of a value of a lower bit of said first specific bit and a value of a lower bit of said second specific bit;

a fourth AND gate for ANDing the inverted one of the value of said lower bit of said second specific bit and the value of said lower bit of said first specific bit;

a second OR gate for ORing output values from said third and fourth AND gates;

a second inverter for inverting an output value from said second OR gate;

a fifth AND gate for ANDing the inverted one of a value of said first specific bit and a value of said second specific bit;

a sixth AND gate for ANDing the inverted one of the value of said second specific bit and the value of said first specific bit;

a third OR gate for ORing output values from said fifth and sixth AND gates;

a third inverter for inverting an output value from said third OR gate;

a seventh AND gate for ANDing an output value from said first inverter, the output value from said fifth AND gate and the output value from said fourth AND gate;

an eighth AND gate for ANDing the output value from said first inverter, the output value from said sixth AND gate and the output value from said third AND gate;

a ninth AND gate for ANDing the output value from said first OR gate, the output value from said sixth AND gate and the output value from said fourth AND gate;

a tenth AND gate for ANDing the output value from said first OR gate, the output value from said fifth AND gate and the output value from said third AND gate; and a fourth OR gate for ORing an output value from said third inverter and output values from said seventh to tenth AND gates and outputting the ORed result as a leading-zero anticipation signal of said specific digit.

4. A floating-point arithmetic device as set forth in claim 3, wherein the values of said upper bits are regarded as 0 if said first and second specific bits are most significant bits and the values of said lower bits are regarded as 0 if said first and second specific bits are least significant bits.

5. A floating-point arithmetic device as set forth in claim 1, wherein said leading-zero counting means includes:

a plurality of first counters, each of said first counters outputting 2-bit data in response to values of two consecutive bits from said leading-zero anticipation means; and a plurality of second counters, each of said second counters outputting 3-bit data in response to said 2-bit data from two adjacent ones of said first counters.

6. A floating-point arithmetic device as set forth in claim 5, wherein each of said first counters includes:

a first AND gate for ANDing said consecutive bit values from said leading-zero anticipation means to determine whether they are 11; and a second AND gate for ANDing the inverted one of the value of a lower one of said two bits and the value of an upper one of said two bits to determine whether said two bit values are 10.

7. A floating-point arithmetic device as set forth in claim 5, wherein each of said first counters outputs 10 if said two consecutive bits from said leading-zero anticipation means are 11, 01 if only an upper one of said two consecutive bits is 1, and 00 regardless of the value of a lower one or said two bits if said upper bit is 0.

8. A floating-point arithmetic device as set forth in claim 5, wherein each of said second counters includes:

a first AND gate for ANDing values of upper bits of said 2-bit data from said two adjacent first counters to output 1-bit data;

a second AND gate for ANDing the value of said upper bit from an upper one of said two adjacent first counters and the inverted one of the value or said upper bit from a lower one of said two adjacent first counters to output 1-bit data;

a third AND gate for ANDing a value of a lower bit of said 2-bit data from said lower first counter and an output value from said second AND gate; and an OR gate for ORing a value of a lower bit of said 2-bit data from said upper first counter and an output value from said third AND gate to output the remaining 1-bit data.

9. A floating-point arithmetic device as set forth in claim 5, wherein each of said second counters makes a most significant bit of said 3-bit data 1 if upper bits of said 2-bit data from said two adjacent first counters are both 1, a middle bit of said 3-bit data 1 if said upper bit from an upper one of said two adjacent first counters is 1 and said upper bit from a lower one of said two adjacent first counters is 0, and a least significant bit of said 3-bit data 1 if said middle bit and a lower bit of said 2-bit data from said lower first counter are both 1 or if a lower bit of said 2-bit data from said upper first counter is 1.

* * * * *